F. H. MOONEY.
MACHINE FOR MAKING FOUNTAIN PEN FEED BARS.
APPLICATION FILED OCT. 9, 1917.

1,303,940.

Patented May 20, 1919.
4 SHEETS—SHEET 1.

INVENTOR
Frank H. Mooney.
By Owen, Owen & Crampton,
His attys.

F. H. MOONEY.
MACHINE FOR MAKING FOUNTAIN PEN FEED BARS.
APPLICATION FILED OCT. 9, 1917.

1,303,940.

Patented May 20, 1919.
4 SHEETS—SHEET 2.

INVENTOR
Frank H. Mooney,
By Owen, Owen & Crampton,
His attys.

F. H. MOONEY.
MACHINE FOR MAKING FOUNTAIN PEN FEED BARS.
APPLICATION FILED OCT. 9, 1917.
1,303,940.
Patented May 20, 1919.
4 SHEETS—SHEET 3.
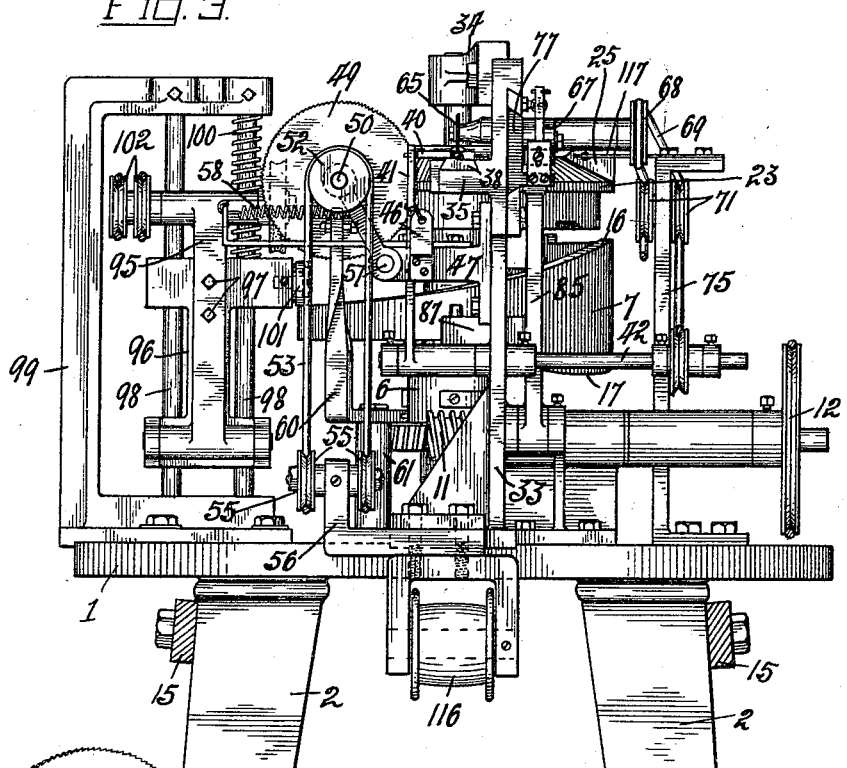
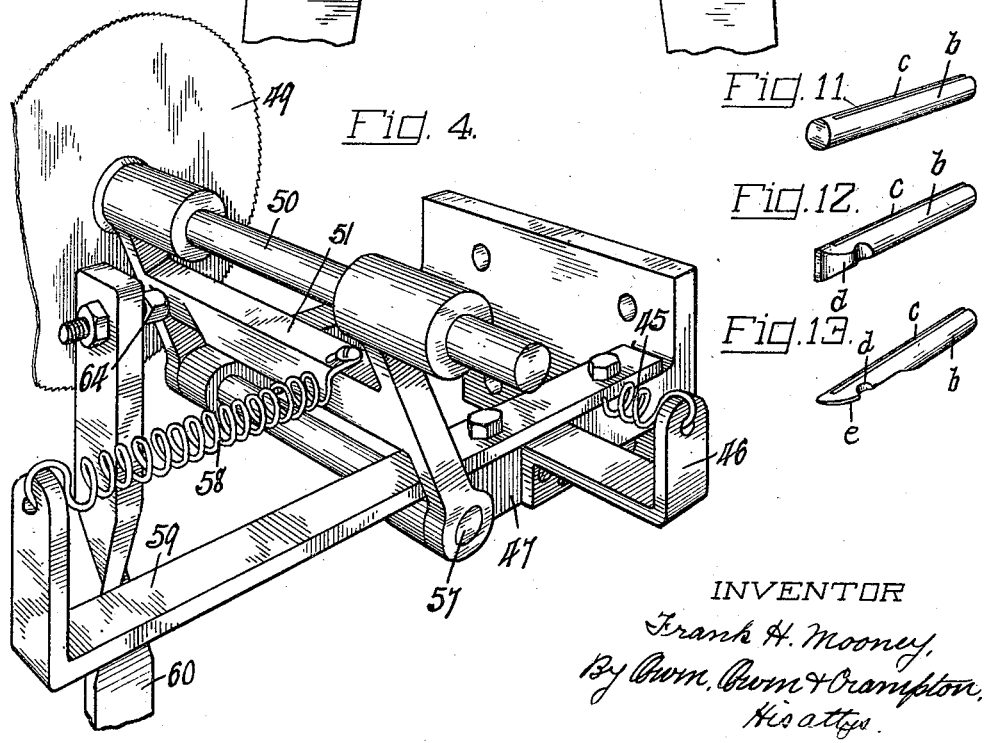
INVENTOR
Frank H. Mooney,
By Owen, Owen & Crampton,
His attys.

F. H. MOONEY.
MACHINE FOR MAKING FOUNTAIN PEN FEED BARS.
APPLICATION FILED OCT. 9, 1917.
1,303,940.
Patented May 20, 1919.
4 SHEETS—SHEET 4.
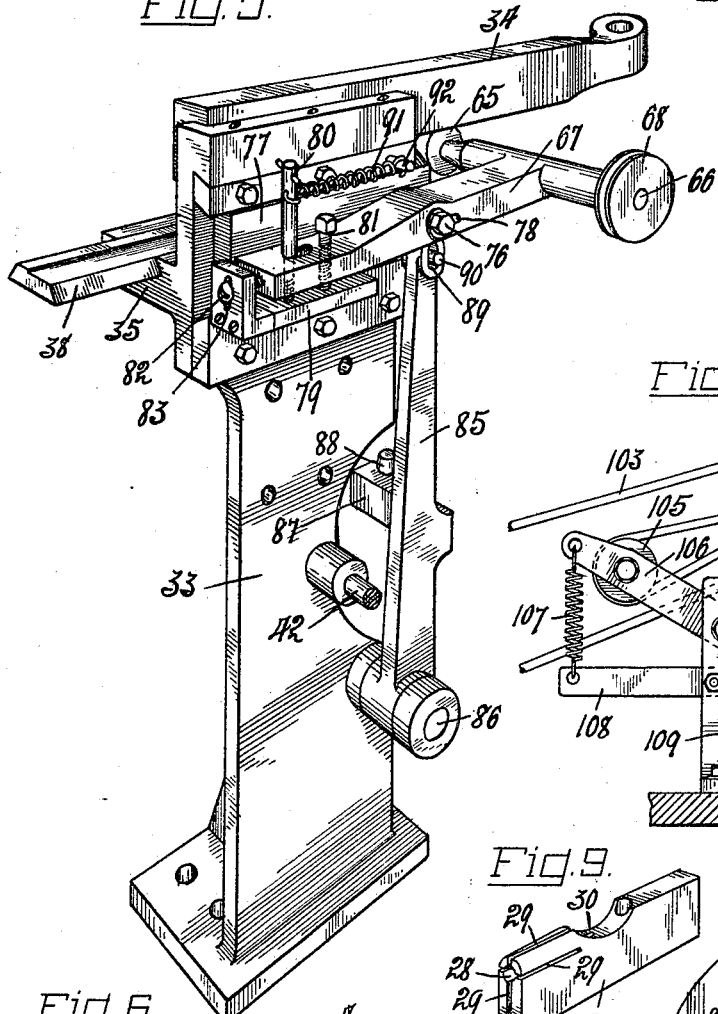
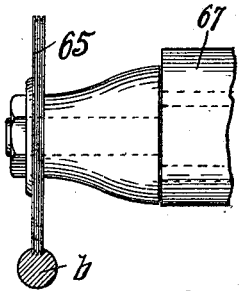
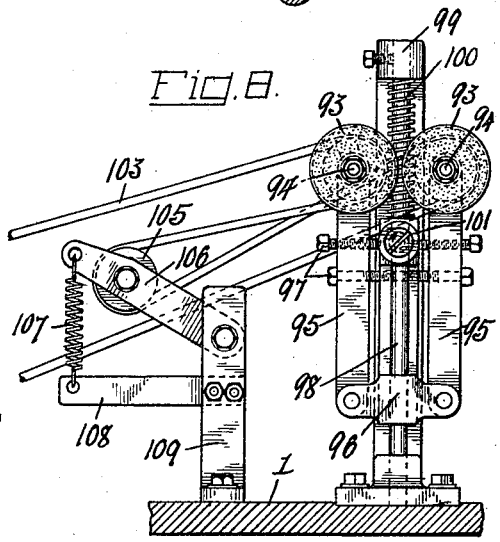
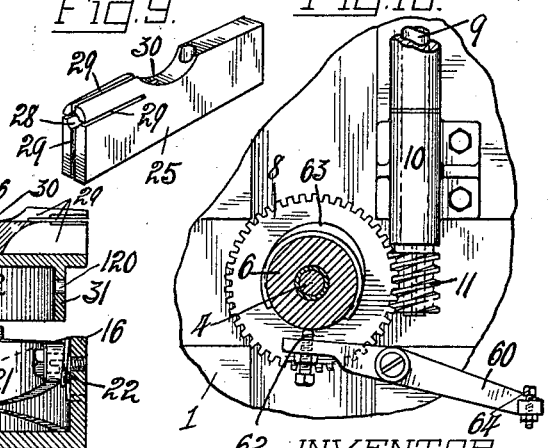
INVENTOR
Frank H. Mooney,
By Owen, Owen & Crampton,
His attys.

UNITED STATES PATENT OFFICE.

FRANK H. MOONEY, OF HINSDALE, ILLINOIS, ASSIGNOR TO THE CONKLIN PEN MANUFACTURING COMPANY, OF TOLEDO, OHIO, A CORPORATION OF OHIO.

MACHINE FOR MAKING FOUNTAIN-PEN FEED-BARS.

1,303,940.

Specification of Letters Patent. Patented May 20, 1919.

Application filed October 9, 1917. Serial No. 195,659.

*To all whom it may concern:*

Be it known that I, FRANK H. MOONEY, a citizen of the United States, and a resident of Hinsdale, in the county of Dupage and State of Illinois, have invented a certain new and useful Machine for Making Fountain-Pen Feed-Bars; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to automatic machines, and particularly to a machine adapted for making the feed-bars of fountain-pens.

The primary object of my invention is the provision of a simple and efficient machine of this character, which is automatically operable to successively feed a predetermined length of stock-bar to a holder member, sever such length from the bar and cut a longitudinal feed groove or grooves therein, then act on opposite sides and then on one side of the nose portion of said length to impart a predetermined shape thereto, after which the finished length or feed-bar is discharged from the holder.

Other objects and advantages of machines embodying my invention and the different sub-combinations thereof will be apparent from the following detailed description and the drawings.

While the invention, in its broader aspect, is capable of embodiment in numerous forms, a preferred embodiment thereof is illustrated in the accompanying drawings, in which—

Figure 1:
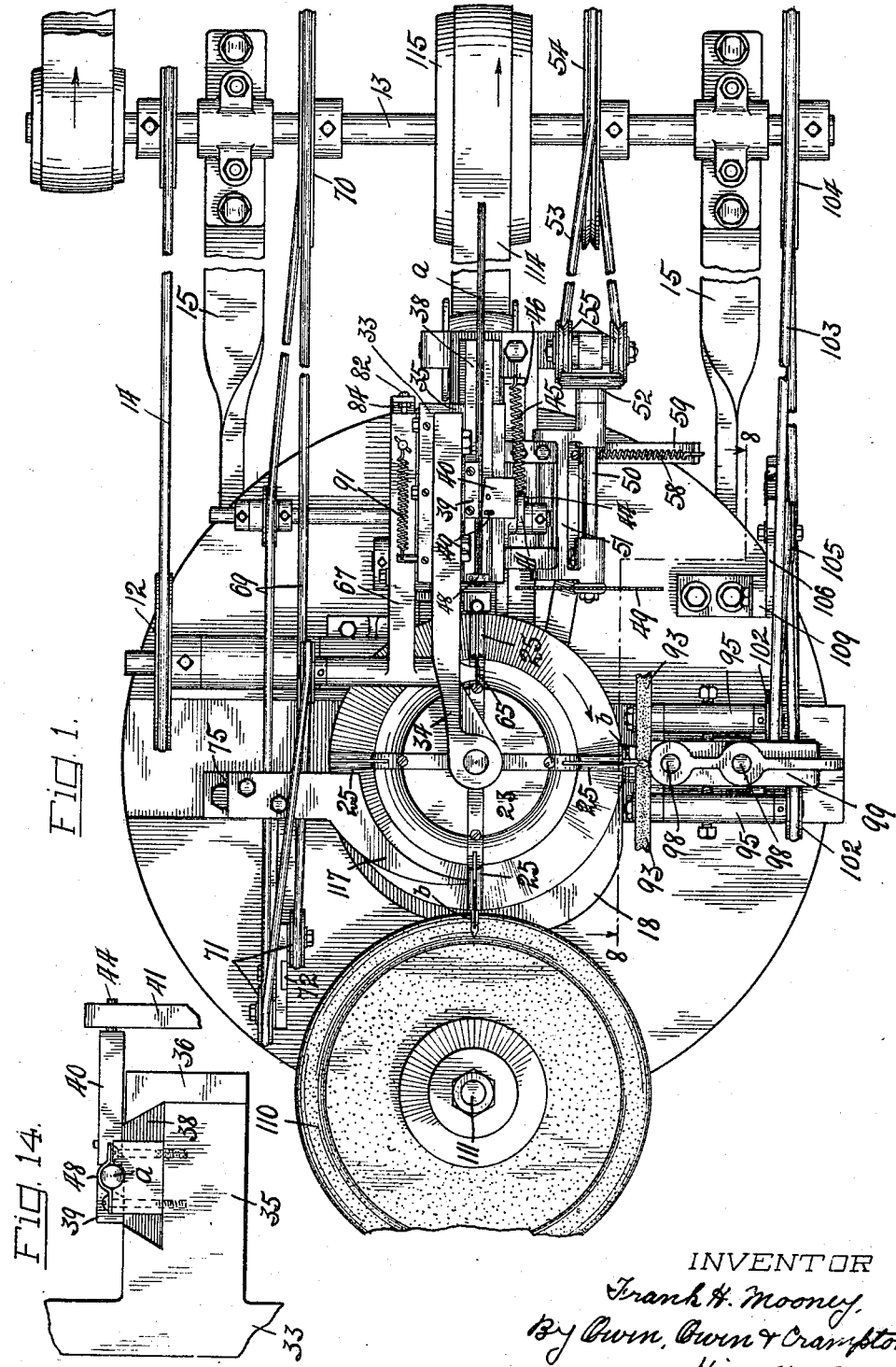
Figure 2:
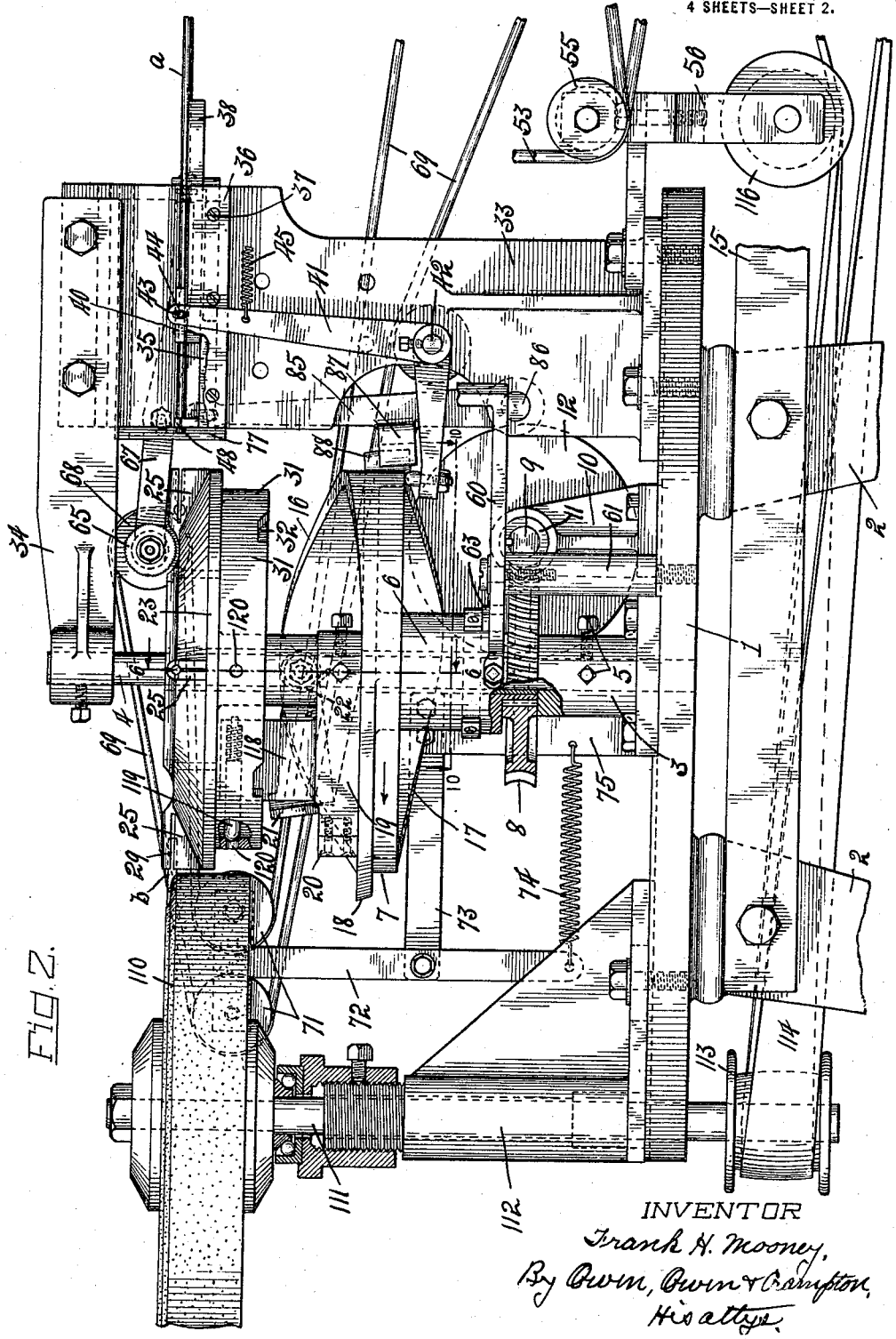

Figure 1 is a top plan view of a machine embodying the invention, with parts broken away. Fig. 2 is an enlarged side elevation thereof, with parts broken away and in section and the edge grinding unit removed. Fig. 3 is a different side elevation of the machine, with parts broken away. Fig. 4 is an enlarged perspective view of the severing mechanism, with a part broken away. Fig. 5 is an enlarged perspective view of the groove-cutting mechanism. Fig. 6 is a section on the line 6—6 in Fig. 2. Fig. 7 is an enlarged edge view of the groove-cutting member and a portion of the parts carrying the same, together with a sectional view of a feed-bar being grooved. Fig. 8 is a section on the line 8—8 in Fig. 1. Fig. 9 is a perspective view of one of the article-holders. Fig. 10 is a reduced sectional detail on the line 10—10 in Fig. 2. Figs. 11, 12 and 13 are perspective views of the feed-bar after the successive grooving, edge grinding and facing operations, and Fig. 14 is an enlarged fragmentary detail of the work-feeding mechanism.

Referring to the drawings, 1 designates a frame-top, in the present instance, of disk form and supported by legs 2 of any desired number. A bearing 3 is mounted on the central top portion of the table 1 and has a vertical shaft 4 fixedly rising therefrom, the shaft being prevented from turning relative thereto by set-screws 5. Mounted loose on the shaft 4 and resting at its lower end on the top of the bearing 3 is a hub-sleeve 6, which is provided at its upper end with a cam-wheel 7 and has a worm-wheel 8 fixed to its lower end for rotation therewith. A horizontal shaft 9 is mounted in bearing-standards 10, which rise from the frame-top 1 at one side of its center, and carries at one end a worm 11 in mesh with the worm-wheel 8 and at its other end a belt-pulley 12, which is driven from a power-shaft 13 by a belt 14. The power-shaft 13 is journaled in bearing-arms 15 projecting, in the present instance, horizontally from the frame-legs 2.

The cam-wheel 7 has upper and lower edge cam-ways 16 and 17, respectively, and a circumferential cam-way 18, the two former having their projections and depressions parallel to the wheel axis and the latter having its projections and depressions radial to the wheel axis.

An arm 19 fixedly projects from the shaft 4 radially thereof and within the cam 16 and is provided at its outer end with a segmental arm or extension 20, which extends therefrom in the direction of rotation of and is concentric to the cam 16 and disposed in adjacent relation to its inner side, as best shown in Figs. 2 and 6. The arm 20 is intended to control the vertical movements of a cam-dog 21, which is pivotally carried by the raised portion of the cam 16 at the inner side thereof. A coiled spring 22 acts on the dog to normally retain it in lowered position.

A table 23 of disk form, in the present instance, is provided at its center with a hub-sleeve 24, which is loosely mounted on the shaft 4 over the arm 19, as best shown in Fig. 6. Four equidistantly spaced article-holders 25, in the present instance, are mounted in radial relation on the top of the table 23, being secured thereto by screws 26, and are illustrated as comprising blocks with the outer ends thereof provided adjacent to their top edges with an article or stock-bar receiving socket 28, the walls of which are severed or split, as indicated at 29, to form yielding article holding or gripping fingers. The top of each holder-block 25 is notched or cut away at the rear of its socket 28, in the present instance, in the form of a segment, as shown at 30, for the transverse passage therethrough of a grooving saw, as hereinafter described.

The table 23 has an annular flange 31 depending from its under side in the vertical plane of the dog 21 and is provided in its lower edge with a number of notches 32 corresponding to the number of article-holders 25 employed. As the dog 21 revolves with the cam-wheel 7, which revolving movement is continuous, it is caused at a predetermined point in each revolution thereof to ride over the segmental elevating arm 20 and to be elevated thereby into position for it to engage within a registering notch 32 in the table 23 and impart a quarter turning movement to said table. The dog is released from the engaged table notch at the end of such quarter revolution by reason of the portion of the dog which is riding on the arm 20 dropping from the elevating portion thereof, such dropping movement being augmented by the action of the spring 22. In Fig. 6 the dog 21 is shown immediately after its release from the table-notch.

A standard 33 rises from the frame-top 1 at one side of the cam-wheel 7 and table 23 and has a bearing arm 34 projecting transversely from its upper end and receiving the upper end of the shaft 4. The standard 33 is provided on one side with a ledge 35 (Figs. 1, 3 and 5), which has a plate 36 secured to its outer side edge by screws 37 and coöperates therewith to form a guide-groove in which a slide-plate 38 of dove-tail form, in the present instance, is mounted for longitudinal sliding movements toward and away from the table 23. This slide-plate has a pair of feed-jaws 39 and 40 for a stock-bar $a$ secured to its top intermediate its ends and in spaced relation transversely thereof, the former being fixed to the slide-plate and the latter being pivoted thereto to adapt it to be rocked into and out of gripping engagement with a stock-bar interposed between the two jaws. A feed-lever 41 of bell-crank form is fulcrumed to the standard 33, as at 42, and has its lower horizontal arm projecting under the edge of the cam-wheel 7 and in engagement with the cam-way 17 thereof, whereby a rotation of said wheel will impart predetermined rocking movements to the lever. The upwardly extending vertical arm of the lever has a vertically elongated slot 43 therein, which receives a pin 44 projecting from the outer side edge of the pivoted feed-jaw 40, whereby an inward rocking movement of said lever-arm will cause the jaw 40 to first be moved into gripping engagement with a stock-bar $a$ in opposition to the jaw 39 and will then cause the two jaws, the slide-plate 38 and the stock-bar to feed forward a predetermined distance. As the stock-bar feeds forward its forward end enters a registering holder-socket 28. Should the feeding movement of the stock-bar be stopped by contact with the inner end of the holder-socket 28 before the feed-lever has completed its feeding stroke the feed-jaws will then be permitted to slide on the stock-bar for the remainder of the lever stroke. The feed-lever 41, after a feeding movement, is returned to its normal position by a coiled contractile spring 45, which connects the vertical arm of said lever with a finger 46 (Figs. 1 and 3), which projects from a bracket-arm 47, that projects transversely from the standard 33 below the ledge 35.

A spring-finger 48 is carried by the ledge 35 at its forward end and exerts a yielding pressure on the stock-bar $a$ to resist a rearward movement of said stock-bar with the feed-jaws 39 and 40 when retracted from forward feeding position. It will be understood that the gripping engagement of the feed-jaws on the stock-bar is released by the rearward stroke of the feed-lever due to the rocking movement which is imparted to the jaw 40 on its pivot, such rocking movement being limited by pin-and-slot connection 49 with the slide-plate 38.

When a predetermined length of the stock-bar $a$ has been fed forward with its forward end inserted into a registering holder 25, a saw 49 is actuated to transversely sever the stock-bar adjacent to the forward end of the ledge 35 or in proper position to leave a predetermined length of such bar in engagement with the holder. The saw 49 is carried at one end of a shaft 50, which is journaled in the upper end portion of a swinging bearing arm 51, and carries a pulley 52 at its opposite end, which is connected by a belt 53 with a pulley 54 on the belt-shaft 13. The course of the belt 53 intermediate the pulleys 52 and 54 is guided by a pair of idler-pulleys 55, carried by a bracket-arm 56 projecting from the frame-top 1. The bearing arm 51 is pivoted for vertical swinging movements to the outer end of the bracket 47, as at 57, and said bearing arm is normally held in retracted position relative to the stock-bar by the action of a coiled contractile spring 58, which connects said bearing arm to a fixed arm 59, which projects from the bracket 47. A lever 60 is fulcrumed for horizontal rocking movements to a bearing standard 61 rising from the frame-top 1 and has one end provided with a contact-screw 62 and positioned to bear inward against a cam surface 63 on the hub-sleeve 6 above the worm-wheel 8, as best shown in Figs. 2, 3 and 10. The other arm of the lever 60 extends outward from its fulcrum and then upward in position for a thrust-stud 64 on its upper end to bear against the rear side of the swinging bearing arm 51. When the cam 63 engages the lever 60 the free end of such lever is swung toward the stock-bar $a$ transversely thereof and swings the bearing arm 51 therewith, thus causing the saw 49 to sever said bar. This severing action of the saw 49 is timed to take place immediately after the stock-bar has been fed forward into engagement with the registering holder 25.

As soon as a length of stock has been fed forward into engagement with a holder 25 a saw or feed-groove cutting member 65 is moved lengthwise of the feed section and caused to cut or form a feed-groove $c$ in one side of the feed-bar section $b$, which is severed from the stock-bar $a$. The groove-saw 65 is carried by a shaft 66, which is journaled crosswise in one end of an arm 67 and carries a belt-pulley 68, which is connected by a belt 69 to a belt-pulley 70 on the power-shaft 13. The belt 70 passes around idler-pulleys 71 intermediate the pulleys 68 and 70, and these idler-pulleys maintain a yielding tension on the belt by reason of being carried by an upright lever 72, which is fulcrumed to a bracket-arm 73 and has its lower end connected by a coiled contractile spring 74 to a standard 75, which rises from the frame-top 1 and from which the bracket-arm 73 also projects. The lever-arm 67 is carried by a fulcrum-pin or bolt 76, which projects from a slide-plate 77, that is mounted for horizontal reciprocatory movements in the side of the standard 33 opposed to the side thereof from which the ledge 35 projects. The fulcrum-pin 76 projects through an elongated slot 78 in the lever to permit limited longitudinal adjustment of the lever relative to said pin. A shelf or ledge 79 projects from the lower edge of the slide-plate 77 under the end of the lever 67 opposed to that which carries the shaft 66, and a post 80 projects through longitudinally extending slot in said lever in shouldered engagement therewith and is threaded into the ledge 79 to retain the lever and ledge in predetermined relative adjustment. A set-screw 81 is threaded through the lever and bears against the ledge 79 to facilitate a relative rocking adjustment of the lever and ledge. A longitudinal adjustment of the lever is obtained by a turning of the screw 82, which projects through a vertically elongated slot 83 in an upturned edge portion of the ledge 79 and threads into the adjacent end of the lever. The screw 82 is fixedly secured to the upturned edge of the ledge 79 by a nut 84 (Fig. 1), which is threaded on the screw and engages the carrying part in opposition to the screw-head.

An operating lever 85 rises vertically from a fulcrum-pin 86 on the standard 33, and a short arm 87 projects transversely from the lever between its upper end and the fulcrum-pin 86 and carries a roller or contact part 88, which bears against the periphery of the cam-wheel 7 in position to be engaged by the peripheral cam surface 18 thereof as the wheel revolves. The upper end of the lever 85 is provided with a vertically elongated slot 89, which loosely receives a pin 90, that projects from the slide-plate 77. It is evident that the lever 85 has a positive outward swinging movement at each revolution of the cam-wheel 7 and that such movement will impart an outward movement of predetermined length to the arm 67 to cause the cutter 65 to move outward radially of the table 23 through the top slot 29 in the respective holder 25 and in groove cutting engagement with the work-section $b$ carried by the holder. The outward movement of the groove-cutter is limited to stop slightly short of the outer end of the work-section $b$ so that the groove $c$ extends from one end to near the other end of the section lengthwise thereof, as shown in Figs. 11, 12 and 13. A coiled contractile spring 91 connects the post 80 to a pin 92 on the standard 33 and normally urges an inward movement of the slide 77 and connected parts and a maintenance of the lever 85 in engagement with the cam-wheel periphery. The groove-cutter 65, when in normal at-rest position, stands in circular register with the notches or in-cuts 30 in the holder 25, to permit the holders to move into and out of register with the cutter as the table 23 is intermittently rotated. The outward or groove-cutting movement of the cutter 65 is timed to commence before the work-section $b$ has been severed from the stock-bar $a$ and its movement is completed after such severing operation.

When the feeding of a work-section $b$ to a holder 25 and the severing and longitudinal grooving of the same has been completed and the groove-cutter 65 returned to its normal position, the dog 21 on the cam-wheel 7 passes over the elevating arm 20 and engages and imparts a quarter turning movement to the table 23, or a sufficient movement thereof to move the next holder 25 in order into position to receive a work-section $b$, while the holder containing the grooved work-section is moved into position to be operated on by the edging unit of the machine by which the nose or outer end portion of the feed-bar or work-section *b* is ground or trimmed in duplicate form on both sides thereof, as shown at *d* in Fig. 12.

The edging unit, which is illustrated in Figs. 1, 3 and 8, comprises a pair of opposed grinding or trimming wheels 93, 93, which may be of carborundum or other suitable abrading material and which are carried on shafts 94 mounted in the upper ends of respective bearing arms 95. These bearing arms are pivoted at their lower ends to the lower end of a cross-head 96 for opposed swinging movements and are adjustably connected by set-screws 97, which coact with the upper end portion of the cross-head 96, a portion of said set-screws being threaded through the arms 95 and in end thrust contact with the cross-head, and a portion being projected loosely through the arms 95 and threaded into the cross-head. The cross-head 96 and parts carried thereby are intended to have vertical reciprocatory movements and are guided for such movements by a pair of guide-rods 98, which are vertically disposed and secured at their ends in the upper and lower arms of a frame-yoke 99, that is mounted on the frame-top 1. A coiled compression spring 100 on one of the guide-rods 98 is disposed between the upper arm of the yoke 99 and the upper end of the cross-head 96 and exerts a yielding downward pressure on the cross-head to normally retain it in lowered position. The upper end of the cross-head 96 is provided at the inner side thereof with a roller 101, which rests on the cam-edge 16 of the wheel 7 and coöperates with said cam-edge to impart predetermined raising and lowering movements to the cross-head and edging-wheels 93 at each revolution of the cam-wheel 7. The edging-wheels 93, when in lowered position, stand below the plane of revolution of the work-sections *b* with the table 23 out of the path of movement of said feed-bars, and when a feed-bar has been moved into edge trimming position, in which position the feed-bar stands in vertical register with the space between the edging-wheels, the cam-edge 16 operates to raise and then to lower the cross-head 96 so that the edging-wheels have edging or trimming engagement with the projecting end of the feed-bar during both the upward and downward strokes of said edging-wheels. This edging operation takes place during the rest period of the table 23 so that the edging-wheels are in their lowered or normal positions during a work shifting movement of the table.

Each of the shafts 94, 94, which carry the edging-wheels, is provided with a belt-wheel 102, and a belt 103 connects both of said pulleys to a drive-pulley 104 on the power-shaft 13. The belt 103 is looped around an idler-pulley 105 intermediate the pulleys 102, 102, said idler-pulleys being carried by a pivoted arm 106 and exerting a yielding tension on the belt by reason of the pull of the belt on said idler-pulley being against a coiled contractile spring 107, which connects the arm 106 to a fixed arm 108, both said arms being carried by a standard 109.

The next work shifting movement of the table 23 moves the work-section *b*, which has just been acted on by the edging-wheels 93, 93, into side engagement with the side edge portion of a grinding or facing-wheel 110 by which the side of the nose portion of the feed-bar opposed to the groove *c* is cut away or faced, as shown at *e* in Fig. 13. The facing-wheel 110 is carried at the upper end of a vertical shaft 111, which is journaled in a bearing standard 112, that rises from one side of the frame-top 1. The lower end of the shaft 111, which projects below the frame-top 1, carries a pulley 113, which is connected by a belt 114 to a pulley 115 on the power-shaft 13. An idler-pulley 116 guides the upper course of this belt and is carried by the bracket 56.

The facing-step completes the operations on the feed-bar and during the next advancing movement of the table 23 a work ejecting finger 117 enters the side-groove 29 of the respective holder 25 at the rear of the feed-bar carried thereby and, as the holder advances, slidingly engages the inner end of the feed-bar and forces it from the holder to be received by any suitable receptacle provided in position for the feed-bar to fall therein. The ejecting finger 117 is carried by and projects inward from the upper end of the standard 75 and has its outer feed-bar engaging edge eccentric to the table axis so as to have a camming action on the feed-bar as one is moved in contact with the other.

In order to arrest and yieldingly hold the table 23 in stationary position after each intermittent turning movement thereof, the stationary arm 19, which projects from the shaft 4 has a lateral extension or boss 118 projecting upward therefrom within the table-flange 31 and carrying a spring-pressed detent 119, which engages within one of a series of sockets 120 in the flange 31 during each rest period of the table (see Fig. 2).

The operation of my machine is as follows: At each revolution of the cam-wheel 7, which wheel is continuously revolving, the dog 21, at a predetermined point in such revolution, rides over the segmental arm 20 and engages and imparts a predetermined rotary movement to the table 23 so as to advance each work-holder 25 carried thereby one step in their respective step-by-step revoluble movements with the table. At each of such table movements an empty holder 25 is moved into register with a stock-feed-bar *a* and the table then remains at rest during the remainder of the revolution of the cam-wheel 7. As soon as the table 23 is brought to rest the cam-edge 17 of the cam-wheel acts on the stock-feeding lever 41 to cause it to first rock the stock-bar gripping jaw 40 into gripping engagement with the stock-bar *a* in opposition to the jaw 39 and then to move said jaws, slide-plate 38 and stock-bar forward a predetermined extent until the forward end of the stock-bar has entered the holder-socket 28 the maximum extent. The cam-edge 17 then permits the retraction of the feed-lever 41 under the action of the spring 45 to retract the slide-plate 38 and feed jaws, the stock-bar being held against retracting movements during such rearward stroke of the feed-lever by the spring-finger 48. During such retracting movement of the feed-lever the cam 63 on the hub-sleeve 6 engages the lever 60 and rocks it in a direction to swing the bearing arm 51 and saw 49 carried thereby forward to cause said saw to sever the stock-bar at a predetermined point without the holder 25 into which the bar has just been fed, thus leaving what may be termed the feed-bar or work-section. Before the severing saw 49 has returned to its normal position, which return is occasioned by the spring 58, the peripheral cam surface 18 on the wheel 7 coacts with the roller or part 88 on the lever 85 and effects an outward rocking of said lever and a consequent outward movement of the slide 77, lever-arm 67 and grooving-cutter 65 carried thereby, said cutter, in its movement, passing from the notch 30 in the holder-top lengthwise of said holder through the top slot 29 therein and in longitudinal grooving engagement with the top of the feed-bar or work-section which is carried by said holder, the outward movement of the cutter being stopped to terminate the groove *c*, which it cuts in the feed-bar slightly short of the outer end of said bar, as shown in Fig. 11. When the cutter has completed its outward stroke the cam surface 18 permits its return to normal position, which return is effected by the spring 91. The arm which carries the cutter 65 is longitudinally and swingingly adjustable with respect to the slide 77 by which it is carried so as to gage the depth of the cut and also its length with respect to the stroke of the cutter. When the cutter has returned to its normal position the cam-wheel 7 has approximately completed a revolution and the dog 21 is again in position to be raised by the segmental arm 20 and to engage and impart a quarter turn (if four holders are employed) to the table 23 during the first portion of the succeeding revolution of the cam-wheel, the dog then dropping out of engagement with the table and leaving the table in stationary position by reason of the engagement of the detent 119 with a registering recess 120 therein. This movement of the table moves an empty holder into register with the stock-bar *a* to permit a part thereof to be engaged with the holder and severed and grooved as before described, while the holder 25, which received a work-section *b* during the preceding revolution of the cam-wheel 7, is moved to place its feed-bar over the plane of the edging-wheels 93, 93 in vertical register with the space therebetween. During the succeeding rest period of the table 23 the cam-wheel acts on the roller 101 and effects a raising of the edging-wheels 93 past the associated work-section *b* in opposed edging engagement with the outer end or nose portion thereof and then permits a lowering of said wheels to normal position. At the next revolution of the cam-wheel 7 the table 23 is again given a partial turn to move the work-section, which has just been edged, into facing engagement with the grinding-wheel 110 by which the side of the nose portion of the work-section opposed to the groove *c* is faced or given a predetermined shape, as shown at *e*, Fig. 13. At the next revolution of the cam-wheel the faced work-section moves with the table 23 out of engagement with the grinding-wheel 110 and during such movement is acted on by the ejecting finger 117 and discharged from the holder. The empty holder then, at the next revolution of the cam-wheel, is moved into receiving relation to the stock-bar *a*, as is apparent.

It is evident that my machine is operable in an efficient and rapid manner to successively feed predetermined lengths of stock to the work-holders as they are successively moved into register with the stock, to sever each work-section from the stock, longitudinally groove the same and edge and face the outer end portion of the work-section in predetermined shape, after which the work-section is ejected from the holder in condition for use, except for a possible buffing of the same, if such buffing operation is desired.

While I have herein shown and described one specific embodiment of my invention for illustrative purposes and have disclosed and discussed in detail the construction and arrangement incident to one specific application thereof, it is to be understood that the invention is not limited to the mere detail or relative adjustment of the parts nor to the particular form and arrangement of the sub-combinations illustrated, but that deviations from the illustrated form or embodiment of the invention may be made without departing from the spirit of the claims.

Having thus described my invention, what

I claim as new, and desire to secure by Letters Patent, is—

1. In a machine of the class described, the combination with a work-holder movable into and out of work receiving position, of means for introducing a predetermined length of work-bar into said holder and severing the same from its bar, and means embodying a groove-cutter and operable to periodically move said cutter through the work-holder lengthwise thereof and in longitudinal side grooving engagement with the work-piece carried by the holder.

2. In a machine of the class described, a work-holder, means operable to periodically feed work-pieces to said holder, and means embodying a rotary cutter and periodically operable to move the cutter lengthwise of a work-piece carried by the holder to longitudinally groove the same, said means having a cam-part for controlling the movements thereof.

3. In a machine of the class described, a work-holder, means periodically operable to introduce work-pieces into said holder, a reciprocatory member, a lever adjustably carried by said member for movements therewith, a rotary cutter carried by said lever, and means operable to reciprocate said member and lever to move the cutter lengthwise of a work-piece carried by said holder to longitudinally groove the same.

4. In a machine of the class described, the combination with a work-holder, of work edging means comprising a slide mounted for reciprocatory movements in a plane transverse to a work-piece carried by said holder, a pair of arms projecting from said slide for opposed relative pivotal movements, means for adjusting said arms relative to each other and to said slide, edging-wheels carried in opposed relation by said arms and adapted, when reciprocated with the slide, to pass on opposite sides of a work-piece in edging contact therewith, and means operable to impart predetermined reciprocatory movements to said slide.

5. In a machine of the class described, a work-holder, means carrying said work-holder and operable to impart intermittent revoluble movements thereto in one direction, separate means operable at different stages in a movement of said work-holder to feed a length of stock thereto, sever and longitudinally groove the fed length, and edge-trim the same, and common rotary cam means for controlling the action of said work-feeding, severing, grooving and edging means.

6. In a machine of the class described, a rotatable member, a work-holder carried thereby, a dog mounted for revoluble movements at one side of said member and normally standing out of engagement therewith, and means for coacting with the dog at a predetermined point in its movement to move it into engagement with said member, retain such engagement during a predetermined portion of the revoluble movement of the dog, and then to permit a disengagement of the dog and member.

7. In a machine of the class described, a rotatable member, a work-holder carried by said member, separate means operable at different positions of movement of said holder to feed a predetermined length of work-stock thereto, sever, longitudinally groove and edge said length, a rotating cam-wheel having different cam surfaces for coacting with said several means to periodically actuate the same, a dog carried by said wheel for revoluble movements therewith, and means for periodically moving said dog into engagement with said member and retaining such engagement for a predetermined period to impart predetermined periodical intermittent movements to said member.

8. In a machine of the class described, a rotating cam means, a work-holder located at one side of said means and having a common axis of rotation therewith, and separate means operable by said cam means to periodically rotate said work-holder and feed work-pieces thereto.

9. In a machine of the class described, a rotating cam means, a work-holder located at one side of said means and having a common axis therewith, and separate means operable by said cam means to periodically rotate said work-holder and to groove work-pieces carried thereby.

10. In a machine of the class described, a rotating cam means, a work-holder having a common axis therewith, and separate means operable by said cam means to periodically rotate said work-holder and to sever work-pieces fed thereto.

11. In a machine of the class described, a rotating cam means, a work-holder having a common axis therewith, and separate means operable by said cam means to periodically rotate said work-holder and to periodically feed work-pieces thereto.

12. In a machine of the class described, a rotating cam means, a work-holder having a common axis therewith, and separate means operable by said cam means to periodically rotate said work-holder, to periodically feed work-pieces thereto and to periodically sever work-pieces from a feed-bar.

13. In a machine of the class described, a rotating cam means, a work-holder having a common axis therewith, and separate means periodically operable to rotate said work-holder, to feed work-pieces thereto and to longitudinally groove said work-pieces.

14. In a machine of the class described, rotatable cam means, a work-holder having a common axis therewith, and separate means operable by said cam means to periodically rotate said work-holder, to successively feed work-pieces thereto, to sever the work-pieces from a stock-bar and to longitudinally groove the work-piece.

15. In a machine of the class described, a rotating cam-means, a work-holder having a common axis therewith and having a radial work receiving socket, and separate means operable by said cam means to intermittently rotate said work-holder and to periodically feed work-pieces into said socket.

16. In a machine of the class described, a rotating cam means, a work-holder having a common axis therewith and a radially disposed work receiving socket, and separate means operable by said cam means to intermittently rotate said work-holder to periodically feed work-pieces into the work-holder socket and to longitudinally groove the work-pieces while held in said socket.

17. In a machine of the class described, a work-holder and a cam means mounted for relative rotary movements and having a common vertical axis of rotation, means for continuously driving said cam means, and separate means operable by said cam means to intermittently rotate said work-holder to periodically feed work-pieces thereto and to groove a work-piece carried by the work-holder during a rest period of said holder.

18. In a machine of the class described, a rotating cam means, a work-holder having a common axis therewith, and separate means operable by said cam means to intermittently rotate said work-holder and to both feed a work-piece to said holder and to longitudinally groove the same during a rest period of the work-holder.

19. In a machine of the class described, a rotating cam means, a work-holder having a common axis therewith, and separate means operable by said cam means to periodically rotate said work-holder and to edge-groove a work-piece carried thereby.

20. In a machine of the class described, a rotating cam means, a work-holder having a common axis therewith, edge-grooving means mounted for reciprocatory movements at a side of said work-holder, and separate means operable by said cam means to periodically rotate said work-holder and to move said edge-grooving means to act on a work-piece carried by the work-holder.

21. In a machine of the class described, a rotating cam means, a work-holder having a common axis therewith, and separate means operable by said cam means to periodically rotate said work-holder, feed work-pieces thereto and to transversely edge-groove the work-pieces while carried by the work-holder.

22. In a machine of the class described, a rotating cam means, a work-holder having a common axis therewith, and separate means operable by said cam means to periodically rotate said work-holder and to periodically and successively, longitudinally and transversely groove a work-piece carried by the work-holder at different positions in its movement.

23. In a machine of the class described, a movable work-holder, a rotatable cam means, and separate means operable by said cam means to periodically and successively, longitudinally and transversely groove a work-piece carried by said work-holder.

24. In a machine of the class described, an intermittently movable work-holder, means for longitudinally grooving a work-piece carried by said holder, means for transversely grooving a work-piece carried by said holder, and a common cam means for periodically operating both said grooving means.

25. In a machine of the class described, an intermittently movable work-holder, means operable to longitudinally groove a work-piece carried by said holder when at one point in its movement with the holder, means having opposed edge-grooving members reciprocably movable to transversely trim a work-piece carried by said holder when at another predetermined point in its movement therewith, and common cam means connected to both said grooving and trimming means and operable to impart respective operating movements thereto.

26. In a machine of the class described, an intermittently moving work-holder, a rotatable cam means having transversely extending cam surfaces at opposite sides thereof, means actuated by the movement of one of said cam surfaces to periodically feed work-pieces to said work-holder, and means actuated by the movement of the other of said cam surfaces to periodically trim work-pieces carried by said work-holder.

27. In a machine of the class described, an intermittently movable work-holder, rotatable cam means having radial and side edge cam surfaces, and separate means respectively actuated by movements of the radial and side cam surfaces of said cam means to longitudinally groove and edge-groove a work-piece at different positions of its movement with said work-holder.

28. In a machine of the class described, an intermittently movable work-holder, a cam means having a peripheral and opposite side edge cam surfaces, and separate means operated by different of the cam surfaces of said cam means to periodically feed work-pieces to said work-holder and both longitudinally and transversely groove the same at predetermined points in a movement of the work-holder.

29. In a machine of the class described, a rotatable work-holder, and separate means periodically operable on a work-piece at different predetermined points in a movement thereof with the work-holder to longitudinally groove a work-piece and to edge-trim the same, the movements of the work coacting parts of said grooving and trimming means being in intersecting planes.

30. In a machine of the class described, an intermittently rotatable work-holder having a radially disposed work-holding part, means having a grooving cutter periodically movable radially of said work-holder to groove a work-piece carried thereby, and means having edge-trimming members and periodically operable to move said members substantially parallel to the axis of said work-holder to edge-trim a work-piece carried thereby.

31. In a machine of the class described, a work-holder mounted for rotary movements, a stationary cam disposed at one side of said work-holder, and revoluble means periodically operable by said cam to engage said work-holder and then to impart predetermined rotary movement thereto.

32. In a machine of the class described, an intermittently movable work-holder, means having a cutter and periodically operable to longitudinally groove a work-piece carried by said work-holder when the holder is in one position of its movement, and means embodying opposed trimmer members and periodically movable transversely of a work-piece to edge-trim the same when the holder is in another position of its movement.

33. In a machine of the class described, an intermittently movable work-holder, means having a cutter and periodically operable to longitudinally groove a work-piece carried by said work-holder when the holder is in one position of its movement, means embodying trimmer members periodically movable transversely of a work-piece to edge-trim the same when the holder is in another position of its movement, and means operable to face a side portion of a work-piece when the holder is in another position of its movement.

34. In a machine of the class described, means having a cutter and periodically operable to longitudinally groove one side portion of a work-piece carried by said holder when the holder is in one position of its movement, means embodying opposed trimming members and periodically movable transversely of a work-piece to edge-trim the same when the holder is in another position of its movement, and means for first grinding a side portion of a work-piece in opposition to its curved side and at right angles to its trimmed edges when the holder is in another position of its movement.

In testimony whereof, I have hereunto signed my name to this specification.

FRANK H. MOONEY.

Copies of this patent may be obtained for five cents each, by addressing the "Commissioner of Patents, Washington, D. C."